(12) United States Patent
Moore

(10) Patent No.: US 8,185,962 B2
(45) Date of Patent: May 22, 2012

(54) APPARATUS, SYSTEM, AND METHOD FOR ENFORCING POLICY REQUIREMENTS ASSOCIATED WITH A SERVICE

(75) Inventor: John A. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 12/275,792

(22) Filed: Nov. 21, 2008

(65) Prior Publication Data

US 2010/0132050 A1 May 27, 2010

(51) Int. Cl.
G06F 9/00 (2006.01)
G06F 7/04 (2006.01)
G06F 15/16 (2006.01)
(52) U.S. Cl. ............. 726/28; 709/203; 709/220; 726/12
(58) Field of Classification Search .................... 726/28, 726/12; 705/50; 709/203, 220
See application file for complete search history.

(56) References Cited

U.S. PATENT DOCUMENTS

| 8,032,557 | B1* | 10/2011 | Vijendra et al. | 707/783 |
| 2003/0131251 | A1* | 7/2003 | Fetkovich | 713/193 |
| 2005/0060365 | A1* | 3/2005 | Robinson et al. | 709/203 |
| 2006/0130139 | A1* | 6/2006 | Sobel et al. | 726/22 |
| 2008/0005285 | A1* | 1/2008 | Robinson et al. | 709/220 |
| 2008/0244724 | A1* | 10/2008 | Choe et al. | 726/12 |
| 2010/0175068 | A1* | 7/2010 | Fifer et al. | 718/104 |
| 2011/0093914 | A1* | 4/2011 | Jacobson | 726/1 |

* cited by examiner

Primary Examiner — Charles C Agwumezie
(74) Attorney, Agent, or Firm — MH2 Technology Law Group LLP

(57) ABSTRACT

A computer-readable medium having stored thereon a plurality of instructions including instructions that when executed by a processor enable a service provider to track and enforce policy requirements associated with a provided service of the service provider. The application software configured to provide notification of the policy requirements and to trigger an intentional degradation of the provided service as a function of time when a user fails to comply with at least one of the policy requirements.

17 Claims, 3 Drawing Sheets

APPARATUS, SYSTEM, AND METHOD FOR ENFORCING POLICY REQUIREMENTS ASSOCIATED WITH A SERVICE

BACKGROUND

1. Technical Field

The present disclosure relates to an apparatus, system, and method for enforcing policy requirements associated with a service, and more particularly, to an apparatus, system, and method for enforcing policy requirements associated with a service via gradual degradation thereof.

2. Description of Related Art

Service providers sometimes require a recipient (e.g., a user) of the service to comply with minimal and/or mandatory service policy requirements. Service providers that provide large, diverse service offerings may find it difficult to track and/or enforce mandatory service policy requirements. Service policy requirements may include, for example, a user complying with configuration management of a service software application associated with the service (e.g., updating versions of hardware and/or software components associated with the service); maintaining an account in positive standing (e.g., no overdue balance on account); and reporting related service oriented data (e.g., individual remote user(s) of the service may be required to synchronize related reporting and data to a centralized database).

In order to enforce minimal and/or mandatory service policy requirements, service providers may employ service software applications that may implement one or more mechanisms configured to quickly disrupt and/or stop the service being offered to a user until the user of the service complies with the policy requirements. In some instances, such disruption and/or stoppage of the provided service may have an adverse effect on a business relationship between the service provider and user, which, in turn, may result in loss of revenue to both the service provider and a user, and/or reduced user satisfaction.

SUMMARY

According to embodiments described herein in accordance with the present disclosure, there is provided a computer-readable medium having stored thereon a plurality of instructions including instructions that when executed by a processor enable a service provider to track and enforce policy requirements associated with a provided service of the service provider. The application software configured to provide notification of the policy requirements and to trigger an intentional degradation of the provided service as a function of time when a user fails to comply with at least one of the policy requirements.

According to another embodiment of the present disclosure, there is provided a method for providing a service to a user. The method includes determining if a user of the provided service is complying with one or more policy requirements. The method also includes degrading the provided service to the user if the one or more policy requirements are not complied with.

The method further includes notifying the user of the degradation of the provided service. The method includes continuing degradation of the provided service to the user until the user complies with the at least one policy requirement. When the user is in compliance with the one or more policy requirements, the provided service is restored.

According to another embodiment of the present disclosure, there is provided a system for providing a service. In an embodiment, the service is a web-based service. The system includes a host system operatively connected to a network and adapted to process, store, and manage data related to the web-based service. The web-based service is configured to enable access to one or more capabilities associated with the web-based service, wherein a user is required to comply with one or more service policy requirements as specified by a web-based service description associated with the web-based service. The host server also includes at least one processer. The system includes a data processing system including a computing device operable to connect to the network and configured to implement the web-based service.

The system also includes a web-based software application having a set of programmable instructions configured for execution by the processor to enable a service provider of the web-based service to track and enforce the one or more policy requirements associated with the web-based service. In embodiments, the web-based software application is configured to provide notification of the one or more policy requirements and to trigger an intentional degradation of the web-based service as a function of time when a user fails to comply with the at least one policy requirement.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
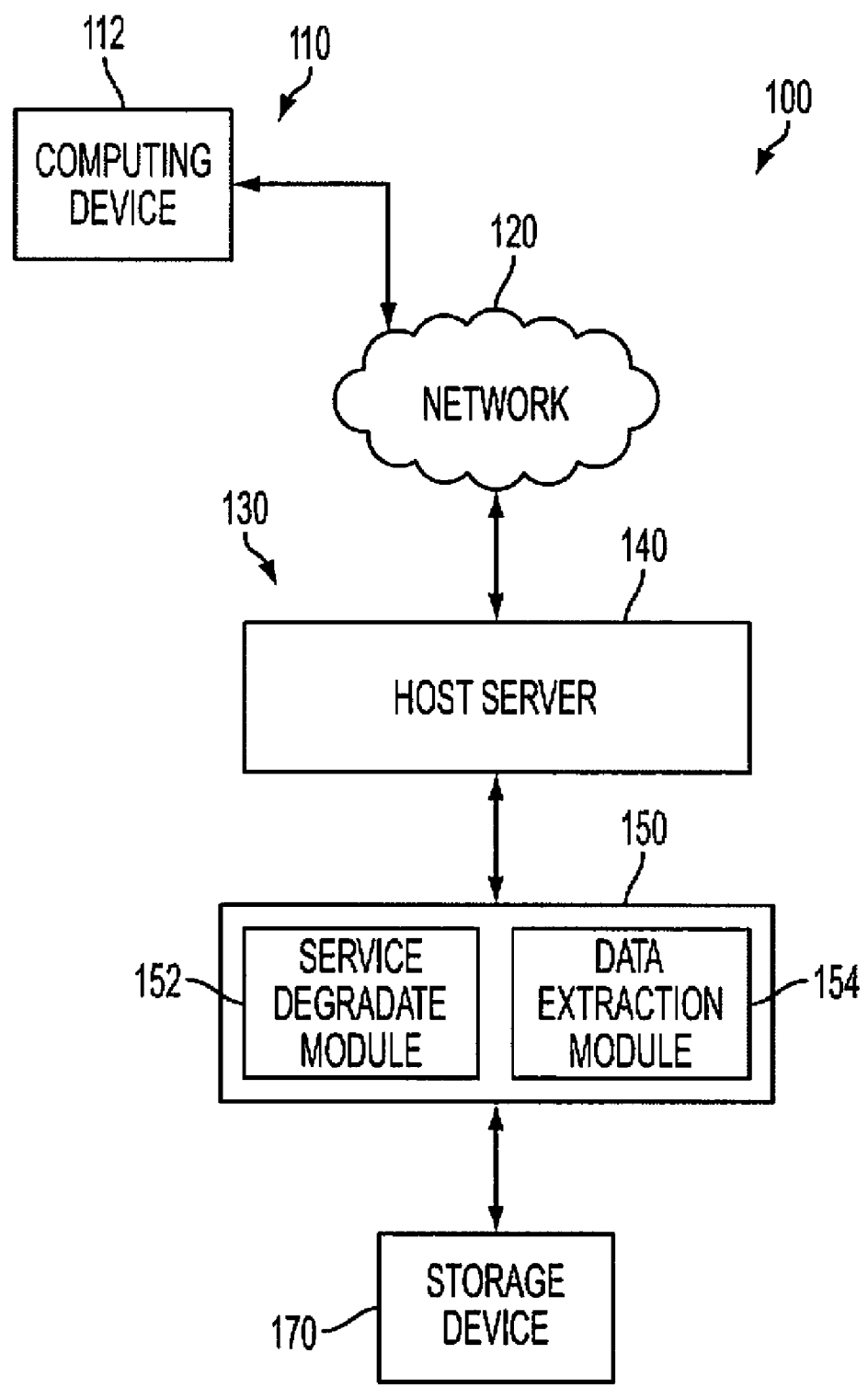
FIG. 1 is a block diagram of a service configured for use with application software in accordance with an embodiment of the present disclosure.

Embodiments of the presently disclosed system will now be described in detail with reference to the drawings in which like reference numerals designate identical or corresponding elements in each of the several views.

For purposes herein, a service is defined as a mechanism that enables access to one or more capabilities, where the access is provided using a prescribed interface and is exercised consistent with constraints and policy requirements as specified by a service description. A service provider is defined as an entity that provides services to other entities. Examples of these services include, but are not limited to, subscription or web-based service, internet access, mobile phone service, web application hosting, etc.

The present disclosure includes an apparatus, system and method for enforcing and/or tracking minimal and/or mandatory policy requirements associated with a service. The apparatus, system and method of the present disclosure are intended to facilitate a service provider in enforcing policy requirements and/or compliance therewith without adversely affecting user satisfaction and/or productivity, such that a healthy and successful business relationship between a service provider and a user(s) may be achieved and/or maintained.

For illustrative purposes, the present disclosure will be described in terms of use with a web-based service (hereinafter referred to simply as a service). An example of a service suitable for use with the present disclosure is the Xerox®

Production Imaging Manager ("XPIM") service, a service offered by Xerox® Global Services. To facilitate understanding of the present disclosure, a brief discussion of an aspect of the XPIM services now follows.

For business reasons, which are beyond the scope of the present disclosure, the XPIM services, and software associated therewith, have in place one or more policy requirements that need to be adhered to by a user of the XPIM service. For example, users of the XPIM software are required to connect to a centralized "data-warehouse" (e.g., database) and provide regular feeds ("syncing up") of service oriented data. In some instances, a direct network connection during the allocated time period is not always possible. Accordingly, during the allocated time period there may be instances where a user is unable to sync up to the data-warehouse, which, under certain circumstances, may result in quick disruption and/or stoppage of the XPIM service to a user. This disruption or stoppage may not be acceptable to a user, especially in the instance where a user still requires the XPIM service.

To this end, and with reference initially to FIG. 1, a system 100 for providing a service to a user in accordance with an embodiment of the present disclosure is shown. In embodiments, system 100 includes a host system 130 operatively connected to a network 120 and a data processing system 110 adapted to process, store, and manage data related to a service (e.g., XPIM service).

Host system 130 is configured to provide a service to a user. Host system is adapted to process, store, and manage data related to a web-based service and configured to enable access to one or more capabilities associated with the service. Host system 130 includes host server 140 accessible by a computing device 112 via network 120 (e.g., Internet, WAN, LAN, Bluetooth, etc.). The host server 140 may be any suitable network device running any known operating system and configured to communicate data over the network 120. In other words, a computer, switch, router, gateway, network bridge, proxy device or other network device that is programmed or otherwise configured to operate as explained herein is considered an embodiment of this disclosure. It should be appreciated that any data communicated to or from the host server 140 may be encrypted to ensure that user information is kept private.

The host system 130 further includes a processing module 150 in operable communication with the host server 140. The processing module 150 may include or be in communication with one or more modules configured to support one or more software applications (e.g., service degradation application software 152).

Data extracted by a data extraction module 154 is stored in a storage device 170 in operative communication with the processing module 150. In embodiments, the storage device 170 may be a database or a plurality of databases in operative communication with the processing module 150. In other embodiments, the host server 140 may include one or more onboard databases. In embodiments, data base 170 stores information related to policy requirement data. In embodiments, data extraction module may be configured to automatically communicate with computing device 112 such that any information relating to policy requirements may be uploaded and stored into storage device 170.

Service degradation application software (software 152) may be a component of application software associated with the service. Alternatively, software 152 may be configured to operate in conjunction with existing application software associated with the service. Software 152 monitors, tracks, and enforces policy requirements specified by a service description associated with the service, and triggers an intentional degradation of the service when a user fails to comply with a policy requirement (e.g., connecting to a database and providing regular feeds of service oriented data) associated with the service. As noted above, policy requirements may also include but are not limited to complying with configuration management of a service software application (e.g., updating versions of hardware and/or software components associated with the service); and maintaining an account in positive standing (e.g., no overdue balance on account).

Software 152 may be configured to degrade the service by known mechanisms. In embodiments, the degradation of the service may be implemented on a per policy requirement basis. In embodiments, degradation of the service may be in the form of restricting service availability. For example, if a user fails to comply with a policy requirement, software 152 may be configured to idle service availability over a predetermined amount of time (for example, one minute every hour). Service availability may be decreased for every second, minute, or hour that a user fails to comply with the policy requirement. In embodiments, service degradation may be in the form of restricting the performance and/or accuracy of the service. For example, if a user fails to comply with a policy requirement, software 152 may be configured to limit the number of compute threads available for running the service, or reduce the output or precision associated therewith. In embodiments, specific features or functions of a service may be restricted and/or disabled. For example, a phone company may disable call-forwarding, caller-ID, call waiting, etc.

In embodiments, software 152 provides notification (e.g., via emailing, phoning, text messaging, etc.) of policy requirements (e.g., new and/or modified policy requirements) and/or degradation of the service if a user fails to comply with the policy requirements. For example, software 152 may be configured to send an email alert to a user if a user fails to comply with one or more policy requirements.

Data processing system 110 includes a computing device 112. Computing device 112 may be any known computing device (e.g., computer, hand-held computing device, printer, cell phone, personal digital assistant (PDA), etc.) suitable to communicate data over a network (e.g., Internet, WAN, LAN, Bluetooth, etc.). In embodiments, the computing device 112 may include several components, including a processor, RAM, a hard disk drive, a USB interface, a network interface, a computer display/monitor, a computer mouse, a computer keyboard, and/or other components. Computing device 112 enables a user to implement the service (e.g., XPIM service)

Figure 2:
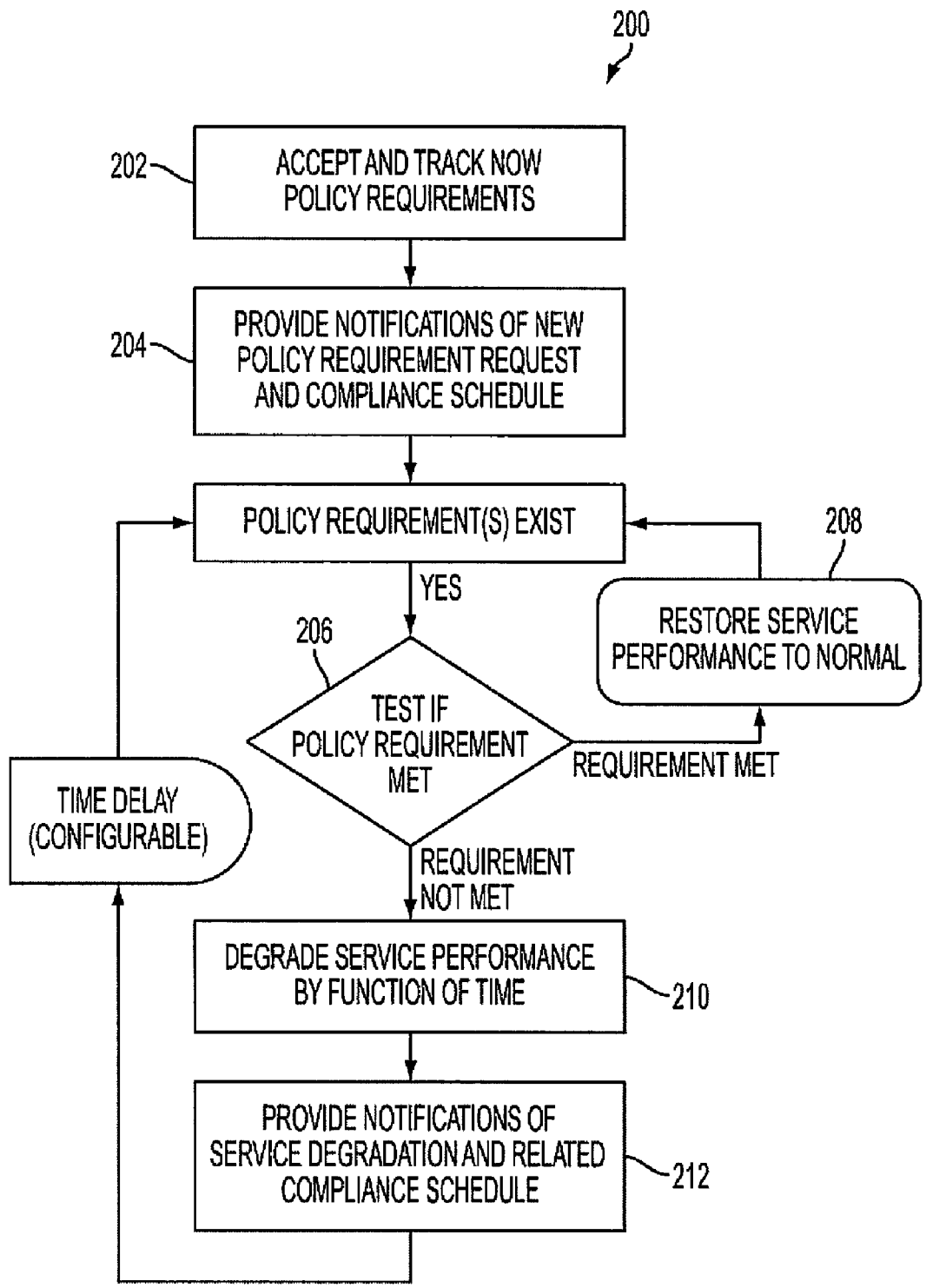
FIG. 2 is a flow chart diagram illustrating an algorithm implemented by the application software of FIG. 1.
Figure 3:
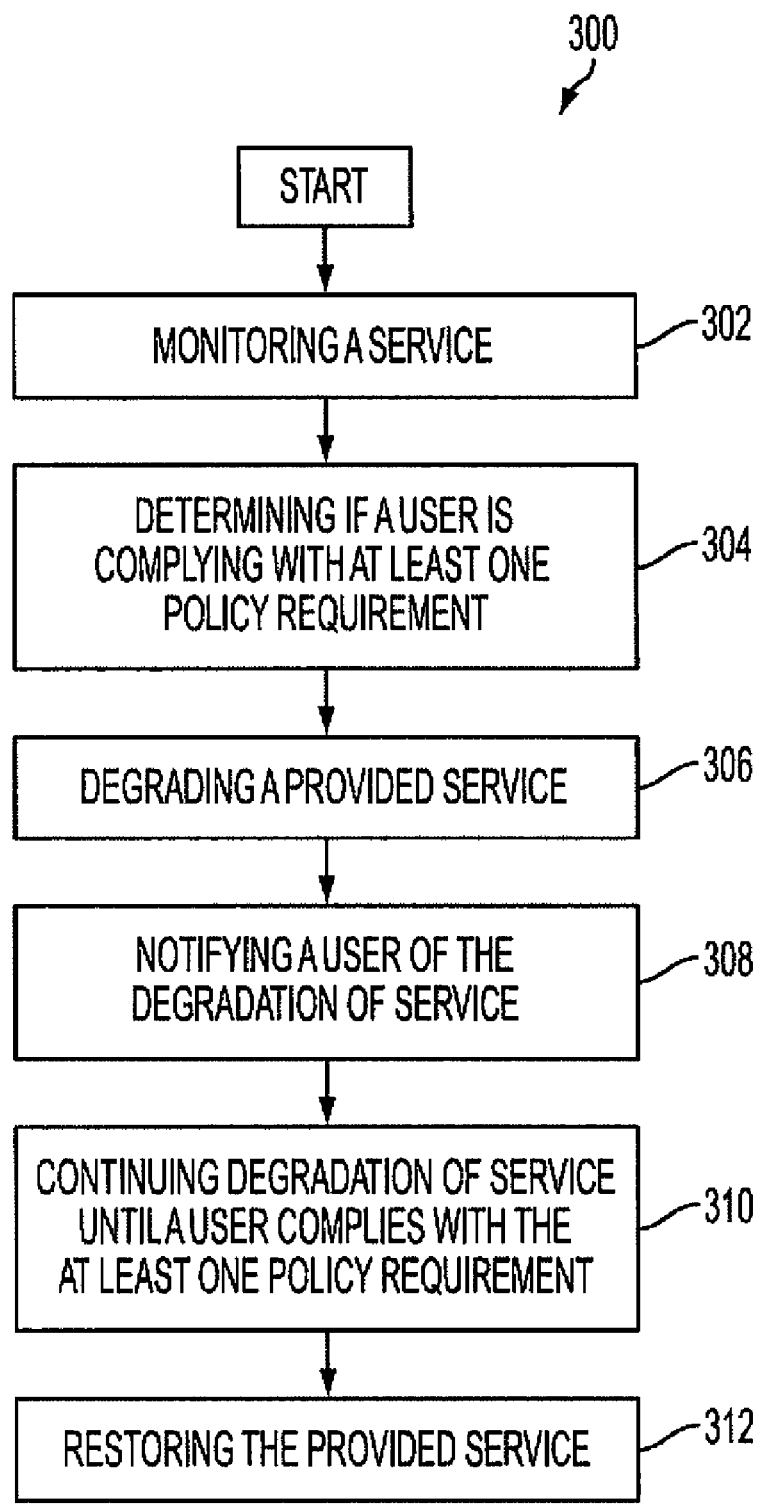
FIG. 3 is a flow chart diagram illustrating a method for enforcing policy requirements associated with a service in accordance with an embodiment of the present disclosure.

FIG. 2 illustrates a flow chart of a control algorithm 200 implemented by software 152. At step 202, software 152 accepts and tracks new policy requirements associated with a provided service. At step 204, software 152 provides notification of the new policy requirements. In embodiments, software 152 may be configured to provide an updated compliance schedule to a user. At step 206, software 152 performs a test to verify user compliance with policy requirements. At step 208, if user complies with policy requirements, then service is unaffected and/or restored to normal. At step 210, if user fails to comply with policy requirements, then service is degraded (e.g., restricted availability) by a function of time. As noted above, software 152 may provide notification (via email, for example) to a user of the service degradation and related compliance schedule. Accordingly, in embodiments, step 212 is implemented to notify a user of service degradation. Based on predetermined time constraints, service degradation continues until a user complies with the policy requirements (see step 206, for example). FIG. 3 illustrates a method 300 for providing a service to a user. At step 302, a provided service is monitored. At step 304, user compliance to one or more policy requirements is determined. At step 306, a provided service is degraded. At step 308, a user is notified of the degradation of the provided service. At step 310, degradation of service is continued until a user complies with the one or more policy requirements. And, at step 312, the provided service is restored.

Examples of how the apparatus, system, and method of the present disclosure may be employed by a service provider in a practical setting now follow. More specifically, in the following examples, a provided service includes or is in operative communication with application software 152. The examples that follow are strictly for illustrative purposes and should not be construed as limiting by any sense of the meaning.

A first example includes a user of a provided service (e.g., XPIM service) failing to comply with minimal and/or mandatory policy requirements (e.g., "syncing up") associated with the XPIM service. The XPIM service is running application software 152, thus, instead of abruptly halting access (e.g., via host server 140) of the XPIM service to a user, a notification (e.g., an alert in the form of an email) is transmitted to user indicating that compliance with the policy requirement has not been met and if non-compliance with the policy requirement is not met within a predetermined amount of time (e.g., 1 hour), the XPIM service will be degraded accordingly (e.g., restrict availability of the service). In this instance, the policy requirement to sync-up may be enforced gracefully with only minor inconvenience to a user. If after an hour the user still has not complied with the policy requirement, a second notification may be sent to a user and the XPIM service may be further degraded, via any of the aforementioned degradation mechanisms.

A second example includes a user of a provided service (e.g., XPIM service) failing to comply with minimal and/or mandatory policy requirements (e.g., updating versions of hardware and/or software components associated with the XPIM service). As in the first example, the XPIM service is running application software 152, thus, instead of abruptly halting access (e.g., via host server 140) of the XPIM service to a user, a notification (e.g., an alert in the form of an email or text message) is transmitted to user indicating that compliance with the policy requirement has not been met and if non-compliance with the policy requirement is not met within a predetermined amount of time (e.g., ½ hour), the XPIM service will be degraded accordingly (e.g., restricted performance and/or accuracy of the service). In this instance, the policy requirement to update the service may be enforced gracefully with only minor inconvenience to a user. If after a ½ hour a user still has not complied with the policy requirement, a second notification may be sent to a user and the XPIM service may be further degraded, via any of the aforementioned degradation mechanisms.

A third example includes a user of a provided service (e.g., cell phone service) failing to comply with minimal and/or mandatory policy requirements associated with the cell phone service (e.g., maintaining account in positive standing). The cell phone service is running application software 152, thus, instead of abruptly halting phone service (e.g., making phone calls) to a user, a notification (e.g., an alert in the form of an email or text message) is transmitted to user indicating that compliance with the policy requirement has not been met and if non-compliance with the policy requirement is not met within a predetermined amount of time (e.g., a month), the cell phone service will be degraded accordingly (e.g., cell phone service provider may disable call-forwarding, long distance calling, caller-ID, call waiting, etc). In this instance, the policy requirement to update the service may be enforced gracefully with only minor inconvenience to a user. If after 2 days a user still has not complied with the policy requirement, a second notification may be sent to a user and the cell phone service may be further degraded, via any of the aforementioned degradation mechanisms.

A fourth example includes a user of a provided service (e.g., internet service) failing to comply with minimal and/or mandatory policy requirements associated with the internet service (e.g., any of the aforementioned policy requirements or those not explicitly disclosed herein). The internet service is running application software 152, thus, instead of abruptly halting internet service (e.g., providing access to the internet) to a user, a notification (e.g., an alert in the form of an email) is transmitted to user indicating that compliance with the policy requirement has not been met and if non-compliance with the policy requirement is not met within a predetermined amount of time (e.g., a day), the internet service will be degraded accordingly (e.g., internet service only provides limited access to the internet). In this instance, the policy requirement may be enforced gracefully with only minor inconvenience to a user. If after one week a user still has not complied with the policy requirement, a second notification may be sent to a user and the internet service may be further degraded, via any of the aforementioned degradation mechanisms.

The foregoing examples provide for service degradation as a function of time. A fifth example provides for service degradation as a function of a service attribute. In this example, a user of a provided service (e.g., image processing service, provided by XGS, for example) fails to comply with minimal and/or mandatory policy requirements associated with the image processing service. In this example, the policy requirement may require a user to upload processing reports to a central data base for every 10,000 images processed. The image processing service is running application software 152, thus, instead of abruptly halting the image processing service (e.g., processing images) to a user, a notification (e.g., an alert in the form of an email) is transmitted to user indicating that compliance with the policy requirement has not been met and if non-compliance with the policy requirement is not met within a predetermined amount of images processed (e.g., 15,000), the image processing service will be degraded accordingly (e.g., limited image processing). In this instance, the policy requirement may be enforced gracefully with only minor inconvenience to a user. If after 20,000 images processed a user still has not complied with the policy requirement, a second notification may be sent to a user and the image processing service may be further degraded, via any of the aforementioned degradation mechanisms.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:
1. A computer-implemented method of providing a network service comprising:
   determining, by a processor, that a user of the network service is not complying with at least one policy requirement associated with the network service;
   notifying the user, using an electronic network interface, of the noncompliance with the at least one policy requirement;

determining, after a specified period of time, that the user has continued to not comply with the at least one policy requirement after notifying the user of the noncompliance;

degrading a level of service provided to the user as part of the network service in response to determining that the user has continued to not comply, after the specified period of time, with the at least one policy requirement, while continuing to allow the user to access the network service in a reduced manner;

notifying the user, using an electronic network interface, of the degradation of the level of service;

continuing to degrade the level of service in proportion to a period of time in which the user continues to not comply with the at least one policy requirement;

determining that the user has complied with the at least one policy requirement; and restoring the level of service to the user in response to determining that the user has complied with the at least one policy requirement.

2. The method of claim 1, further comprising:
monitoring the network service, wherein monitoring includes monitoring a web-based provided service.

3. The method of claim 1, further comprising:
providing a compliance schedule associated with the network service to the user in response to determining that the user has not complied with the at least one policy requirement.

4. The method of claim 1, further comprising:
degrading the level of service as a function of a service attribute.

5. The method of claim 1, wherein degrading the level of service comprises restricting availability of the network service to the user.

6. The method of claim 1, wherein degrading the level of service comprises restricting one of performance and accuracy of the network service with respect to the user.

7. The method of claim 6, wherein restricting accuracy of the network service comprises reducing accuracy of the network service with respect to the user.

8. The method of claim 1, wherein degrading the level of service comprises restricting specific functions of the network service with respect to the user.

9. The method of claim 1, wherein the at least one policy requirement is selected from a group consisting of configuration management, account balance, and data synchronization.

10. The method of claim 1, wherein notifying the user is accomplished via one of emailing, texting and phoning.

11. A computer-readable medium having stored thereon a plurality of instructions including instructions that when executed by a processor cause the processor to perform operations comprising:
determining that a user of the network service is not complying with at least one policy requirement associated with the network service;
notifying the user, using an electronic network interface, of the noncompliance with the at least one policy requirement;
determining, after a specified period of time, that the user has continued to not comply with the at least one policy requirement after notifying the user of the noncompliance;
degrading a level of service provided to the user as part of the network service in response to determining that the user has continued to not comply, after the specified period of time, with the at least one policy requirement, while continuing to allow the user to access the network service in a reduced manner;
notifying the user, using an electronic network interface, of the degradation of the level of service;
continuing to degrade the level of service in proportion to a period of time in which the user continues to not comply with the at least one policy requirement;
determining that the user has complied with the at least one policy requirement; and
restoring the level of service to the user in response to determining that the user has complied with the at least one policy requirement.

12. A system for providing a web-based service, comprising:
a processing system comprising one or more processors; and
a memory system comprising one or more computer-readable media, wherein the computer-readable media store instructions that, when executed by the processing system, cause the processing system to perform operations comprising:
determining, by a processor, that a user of the network service is not complying with at least one policy requirement associated with the network service;
notifying the user, using an electronic network interface, of the noncompliance with the at least one policy requirement;
determining, after a specified period of time, that the user has continued to not comply with the at least one policy requirement after notifying the user of the noncompliance;
degrading a level of service provided to the user as part of the network service in response to determining that the user has continued to not comply, after the specified period of time, with the at least one policy requirement, while continuing to allow the user to access the network service in a reduced manner;
notifying the user, using an electronic network interface, of the degradation of the level of service;
continuing to degrade the level of service in proportion to a period of time in which the user continues to not comply with the at least one policy requirement;
determining that the user has complied with the at least one policy requirement; and
restoring the level of service to the user in response to determining that the user has complied with the at least one policy requirement.

13. A system according to claim 12, the operations further comprising:
providing a compliance schedule associated with the network service to the user in response to determining that the user has not complied with the at least one policy requirement.

14. A system according to claim 12, wherein degrading the level of service comprises restricting availability of the network service to the user.

15. A system according to claim 12, wherein degrading the level of service comprises restricting one of performance and accuracy of the network service with respect to the user.

16. A system according to claim 12, wherein degrading the level of service comprises reducing accuracy of the network service with respect to the user.

17. A system according to claim 12, wherein degrading the level of service comprises restricting a specific function of the network service with respect to the user.

* * * * *